(12) United States Patent  
Pedrazzini et al.

(10) Patent No.: US 9,189,085 B2
(45) Date of Patent: *Nov. 17, 2015

(54) KEY ACTUATION DETECTION APPARATUS AND METHOD

(71) Applicant: STMicroelectronics S.r.l., Agrate Brianza (IT)

(72) Inventors: Gianluca Pedrazzini, Melegnano (IT); Enrico Chiesa, Besozzo (IT); Fabio Pasolini, S. Martino Siccomario (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/632,980

(22) Filed: Oct. 1, 2012

(65) Prior Publication Data

US 2013/0027310 A1 Jan. 31, 2013

Related U.S. Application Data

(60) Continuation of application No. 13/176,541, filed on Jul. 5, 2011, now Pat. No. 8,284,162, which is a division of application No. 11/290,136, filed on Nov. 30, 2005, now Pat. No. 7,973,767.

(30) Foreign Application Priority Data

Dec. 1, 2004 (IT) .............................. TO2004A0848

(51) Int. Cl.
*G06F 3/0354* (2013.01)
*G06F 3/038* (2013.01)

(52) U.S. Cl.
CPC .......... *G06F 3/03543* (2013.01); *G06F 3/0383* (2013.01)

(58) Field of Classification Search
CPC .................... G06F 3/03543; G06F 2203/0333; G06F 3/038
USPC ........ 345/156–175, 177; 178/18.01; 200/5 R; 463/37–38; 715/701–702
See application file for complete search history.

(56) References Cited

U.S. PATENT DOCUMENTS

| | | | |
|---|---|---|---|
| 5,955,668 A | | 9/1999 | Hsu et al. |
| 6,001,014 A | * | 12/1999 | Ogata et al. ..................... 463/37 |
| 6,115,028 A | * | 9/2000 | Balakrishnan et al. ....... 345/157 |
| 6,469,692 B2 | | 10/2002 | Rosenberg |
| 6,513,717 B2 | * | 2/2003 | Hannigan ................. 235/462.45 |
| 6,636,197 B1 | * | 10/2003 | Goldenberg et al. ......... 345/156 |
| 6,727,889 B2 | * | 4/2004 | Shaw ............................. 345/163 |
| 6,766,689 B2 | | 7/2004 | Gardella et al. |

(Continued)

FOREIGN PATENT DOCUMENTS

EP 1 253 399 B1 6/2006
EP 1 365 211 B1 7/2007

*Primary Examiner* — Kumar Patel
*Assistant Examiner* — Mansour M Said
(74) *Attorney, Agent, or Firm* — Seed IP Law Group PLLC

(57) ABSTRACT

A manual pointing device for a computer system, the device having at least one key that can be actuated manually by a user, a click-event detection module coupled to the key to detect actuation thereof on first, second, and third detection axes via an inertial sensing circuit elastically coupled to a casing with a board, the inertial-sensor circuit structured to be carried on the board so as to oscillate and to rotate about the second detection axis.

22 Claims, 6 Drawing Sheets

(56) References Cited

U.S. PATENT DOCUMENTS

| | | |
|---|---|---|
| 6,778,875 B2 * | 8/2004 | Lin et al. ............... 700/121 |
| 7,280,099 B2 * | 10/2007 | Koay et al. ............ 345/163 |
| 7,432,910 B2 * | 10/2008 | Shahoian ............... 345/163 |
| 7,609,250 B2 | 10/2009 | Choi |
| 7,973,767 B2 * | 7/2011 | Pedrazzini et al. ........... 345/163 |
| 8,009,138 B2 * | 8/2011 | Yasutake ................... 345/156 |
| 8,284,162 B2 * | 10/2012 | Pedrazzini et al. ........... 345/163 |
| 2001/0017614 A1 * | 8/2001 | Hara et al. ................ 345/163 |
| 2005/0190152 A1 * | 9/2005 | Vaganov .................. 345/157 |
| 2006/0007148 A1 * | 1/2006 | Theytaz et al. .............. 345/163 |
| 2011/0102340 A1 * | 5/2011 | Martin et al. ............... 345/173 |

\* cited by examiner

KEY ACTUATION DETECTION APPARATUS AND METHOD

BACKGROUND OF THE INVENTION

1. Field of the Invention

The present invention relates to a pointing device for a computer system with inertial click-event detection and to a corresponding click-event detection method.

2. Description of the Related Art

As is known, most computer systems and computer-controlled devices are provided with pointing peripherals that enable commands to be imparted and a high number of operations to be executed in an extremely simple and intuitive way. In particular, the mouse is now the most common interface between a user and a computer and is manually displaced on a plane or on a two-dimensional surface for controlling a cursor or pointing element displayed on a screen. For this purpose, the typical mouse has a plurality of sensors that detect a movement in two dimensions of the mouse, a plurality of keys for entering commands, and a communication interface for communicating with the computer system.

In a conventional mouse, the keys actuate normally-open electromechanical switches so as to modify the state of a recognition circuit, and are controlled directly by the user's fingers (usually, the index finger and the middle finger). In use, the mouse is held by the user in his hand, and the fingers rest on the keys, which are actuated by exerting a slight pressure. To facilitate recognition of voluntary acts by the user, the keys are triggered only if a sufficient force is applied, higher than a pre-set threshold. Since triggering produces a sound event, actuation of a key is typically defined as "click" or "click event".

A drawback of traditional pointing devices is that the contacts of the switches, with time, tend to oxidize, and hence electric-type detection of the click events fails. Clearly, this problem renders unusable traditional pointing devices and limits their average life.

BRIEF SUMMARY OF THE INVENTION

The disclosed embodiments of the present invention provide a pointing device that is an alternative to known devices that is free from the drawbacks described above.

According to one embodiment of the invention, a manual pointing device for a computer system is provided that includes at least one first key manually actuatable by a user, and a click-event detector coupled to the first key for detecting actuation of the first key, the click-event detector including an inertial sensor for detecting mechanical stresses generated by actuation of the first key.

In accordance with another aspect of the foregoing embodiment, the inertial sensor includes a first detection axis and a second detection axis, perpendicular to one another and parallel to a surface of sliding of the manual pointing device at least in one operative configuration, and a third detection axis perpendicular to the first and second detection axes; the inertial-sensor means supplying a first detection signal, a second detection signal, and a third detection signal in response to mechanical stresses acting along the first detection axis, the second detection axis, and the third detection axis, respectively.

In accordance with another aspect of the foregoing embodiment, the device includes a casing and the inertial-sensor is rigidly coupled to the casing for detecting mechanical stresses generated by actuation of the first key and that propagate along the casing.

In accordance with another embodiment of the invention, a user input device is provided that includes at least one element for generating vibrations and a sensor configured to detect the vibrations. Ideally, the sensor is configured to detect vibrations along at least two axes of detection and preferably three axes of detection that are perpendicular to one another.

In accordance with another aspect of the foregoing embodiment, the at least one element includes at least one manually actuated member that, ideally, is a depressible mechanical key mounted on a casing. Preferably the sensor is configured to detect vibrations generated through the casing by the at least one key.

In accordance with another aspect of the foregoing embodiment, a circuit is included in the user input device that is coupled to the sensor and configured to receive detection signals generated by the sensor and to detect displacement signals correlated to a respective key of the at least one key. Preferably the circuit includes an interface for receiving the displacement signals and providing the same to a computer system.

In accordance with another embodiment of the invention, a user input device for a computer system is provided that includes a movable casing having at least two manually disposable keys mounted thereon and transmitting therethrough vibrations generated by the keys when the keys are manually depressed; a transducer mounted on the casing and adapted to detect the vibrations and to generate a detection signal associated with vibrations generated from each key; and a circuit coupled to the transducer and adapted to generate displacement signals responsive to the respective detection signals.

In accordance with another aspect of the foregoing embodiment, the transducer includes an accelerometer device having three axes of detection and supplying corresponding first, second, and third detection signals.

In accordance with another aspect of the foregoing embodiment, the accelerometer device is mounted on a base that is mounted on the casing to rotate about the second detection axis.

In accordance with another aspect of the foregoing embodiment, the device includes a first mechanical-coupling element configured for exerting a pressure on the board asymmetrically with respect to the second detection axis when the first key is actuated so that the board will be inclined when rotated about the second detection axis, and wherein a second key of the at least two keys that can be actuated manually by a user, and in which the first and second keys are set in opposite positions with respect to the second detection axis, the second key having a second mechanical-coupling element configured for exerting a pressure on the board asymmetrically with respect to the second axis when the second key is actuated so that the board is inclined to rotate about the second detection axis. The first and second keys and the first and second mechanical-coupling elements are configured so that the inclination of the board produced by actuation of the first key is opposite to the inclination produced by actuation of the second key.

In accordance with another embodiment of the invention, a manual input device is provided that includes a plurality of keys, each key configured to generate a mechanical stress when manually actuated; a transducer device configured to detect mechanical stress generated from actuation of each key and to generate a respective detection signal; and a circuit coupled to the transducer device to receive the detection signals and to generate in response thereto respective displacement signals.

In accordance with another aspect of the foregoing embodiment, the keys are mounted to a casing, and the transducer is mounted on a board that in turn is mounted to the casing to move about an axis of rotation when subjected to mechanical stress from the keys, and the transducer ideally includes accelerometers to detect movement of the board about at least two axes.

In accordance with a further aspect of the foregoing embodiment, the circuit includes a detector that detects movement of the board and generates corresponding detection signals, and the circuit further includes a processor that receives the detection signals and generates displacement signals correlated to the actuated keys.

BRIEF DESCRIPTION OF THE SEVERAL VIEWS OF THE DRAWING(S)

For a better understanding of the invention, some embodiments thereof will now be described, purely by way of non-limiting example and with reference to the attached plate of drawings, wherein.

DETAILED DESCRIPTION OF THE INVENTION

Figures 1, 3:
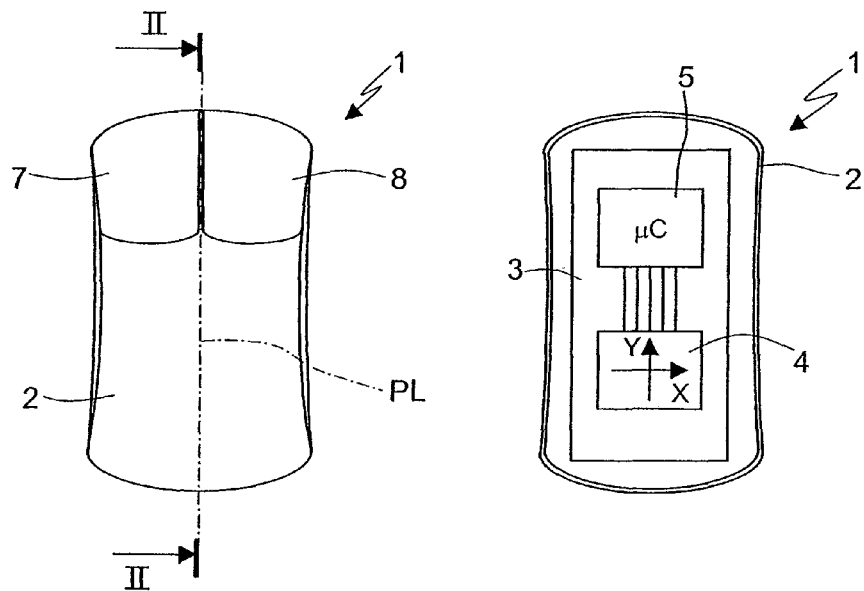
FIG. 1 is a top plan view of a pointing device for a computer system, incorporating the present invention.
FIG. 3 is a top plan view of the device of FIG. 1, sectioned along the plane of trace III-III of FIG. 2.
Figure 2:
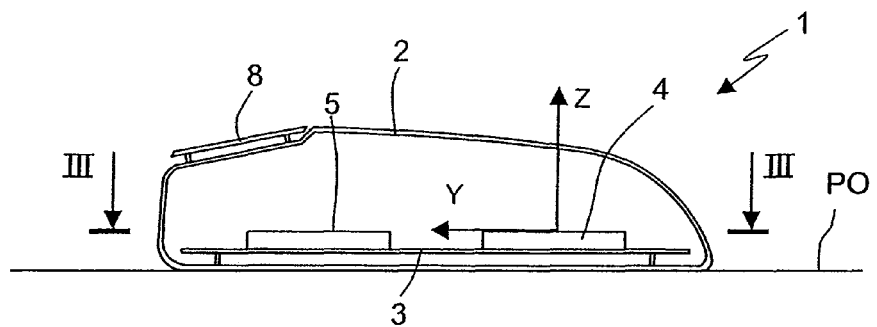
FIG. 2 is a lateral right-hand view of the device of FIG. 1, sectioned along the plane of trace II-II of FIG. 1.

With reference to FIGS. 1-3, a manual pointing device for a computer system, in this case a mouse 1, is illustrated in accordance with one embodiment of the invention. The mouse 1 includes a casing 2 and a board 3, on which are arranged a triaxial inertial sensor 4 and a microcontroller 5.

The casing 2 is made of a substantially rigid polymeric material, suitable for favoring propagation of mechanical vibrations, and has a longitudinal plane PL of symmetry. A first key (left key) 7 and a second key (right key) 8 are arranged on the casing 2 and may be actuated by a user by exerting a slight pressure. The left key 7 and the right key 8 are arranged on opposite sides and preferably in symmetrical positions with respect to the longitudinal plane PL. Furthermore, the keys 7, 8 are provided with a clicking mechanism (known and not shown) and hence exert a small impulse of force on the casing 2 when they are pressed with a force sufficient or when they are released (click event).

The board 3 is rigidly connected to the casing 2, in such a way that, when the casing 2 receives an impulse of force, for example following upon a click event, the vibrations thus generated will be transmitted to the inertial sensor 4 through the board 3.

The inertial sensor 4 is mechanically coupled to the casing 2 through the board 3, for detecting movements of the mouse 1 and impulses of force applied to the casing 2, according to three distinct mutually perpendicular detection axes. Preferably, the inertial sensor 4 comprises a biaxial accelerometer and a uniaxial accelerometer, both of which are made with the MEMS (micro-electromechanical system) technology and are integrated in a same chip. For example, the biaxial accelerometer is of the type described in the European patent application No. EP-A-1365211, whereas the uniaxial accelerometer is made according to European patent application No. EP-A-1253399 filed on Apr. 27, 2001 or to U.S. Pat. No. 5,955,668. In greater detail, a first detection axis X and a second detection axis Y are parallel to a plane of sliding PO of the mouse 1 (generally a horizontal plane, as in FIG. 2), whereas a third detection axis Z, perpendicular to the first two, is substantially vertical. Furthermore, the inertial sensor 4 is arranged such that the second detection axis Y will lie in the longitudinal plane PL of symmetry of the casing 2. Consequently, the left and right keys 7, 8 are in opposite positions with respect to the second detection axis Y. The inertial sensor 4 generates a first analog acceleration signal $S_X$, a second analog acceleration signal $S_Y$ and a third analog acceleration signal $S_Z$ correlated to the components of the accelerations acting on the casing 2 according to the first detection axis X, the second detection axis Y, and the third detection axis Z, respectively (see also FIG. 6).

Figures 4, 5:
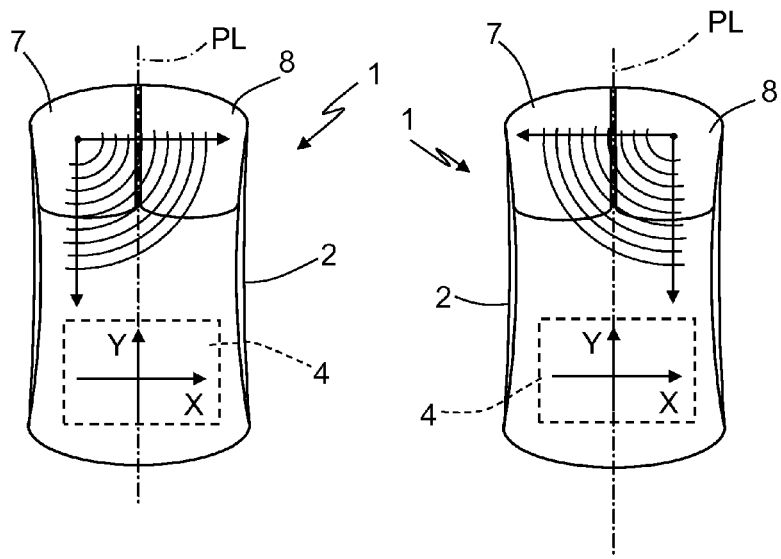
FIGS. 4 and 5 are schematic views which illustrate the propagation of mechanical stresses in the device of FIG. 1.

In practice, when one of the keys 7, 8 is pressed or released, the corresponding click event generates a small force impulse which propagates to the inertial sensor 4 through the casing 2 and the board 3. The inertial sensor 4, which is a MEMS sensor and is hence extremely sensitive, is capable of detecting the vibrations produced by the impulse of force. Click events caused by the left key 7 and by the right key 8, which are opposite with respect to the second detection axis Y, produce stresses of opposite signs along the first detection axis X. As shown schematically in FIGS. 4 and 5, in fact, at the position of the inertial sensor 4 the vibrations caused by click events propagate in the same direction along the second detection axis Y, but in opposite directions with respect to the first detection axis X. Furthermore, a click event can be distinguished from a displacement of the mouse 1 in its plane of sliding PO because also a significant component of acceleration along the third detection axis Z is associated to the click event, which in the case of a planar displacement is substantially absent.

The microcontroller 5 uses the first, second and third analog acceleration signals $S_X$, $S_Y$, $S_Z$ to recognize click events, to discriminate click events produced by the left key 7 and by the right key 8, and to determine the displacements of the mouse 1.

Figure 6:
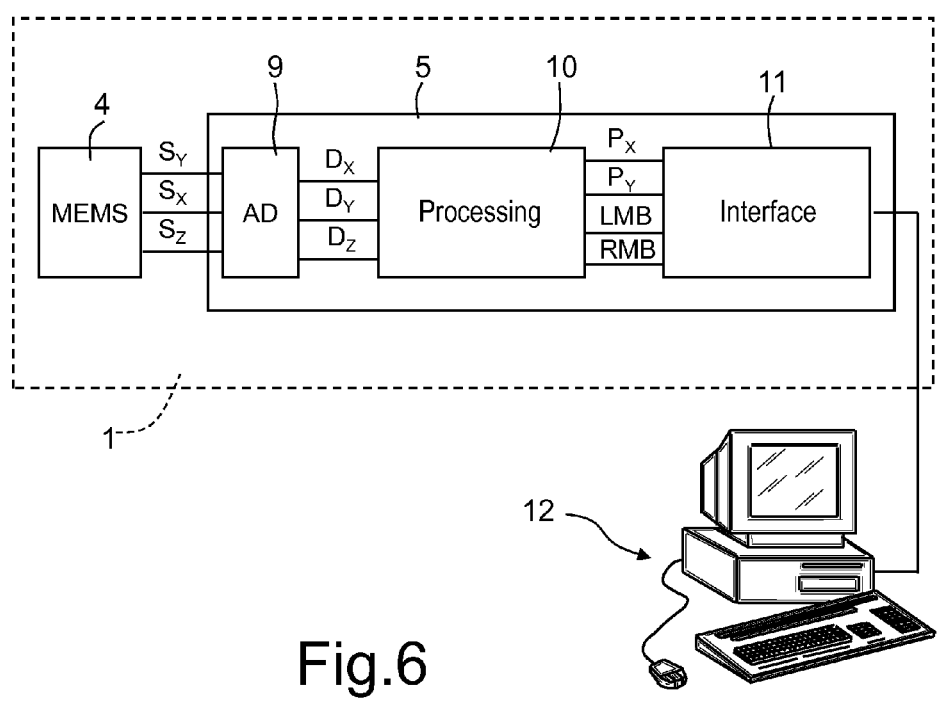
FIG. 6 is a simplified block diagram of the device of FIG. 1.

With reference to the block diagram of FIG. 6, the microcontroller 5 comprises a reading unit 9, a processing unit 10, and an interface 11, for connection to a computer system 12. The reading unit 9 is connected to the inertial sensor 4 for receiving the first, second and third analog acceleration signals $S_X$, $S_Y$, $S_Z$. Furthermore, the reading unit 9 supplies: the inertial sensor 4 with control signals $V_{FB}$ and clock signals $V_{CK}$ necessary for reading; and the processing unit 10 with a first digital acceleration signal $D_X$, a second digital acceleration signal $D_Y$ and a third digital acceleration signal $D_Z$, obtained from the analog-to-digital conversion of the first, second and third analog acceleration signals $S_X$, $S_Y$, $S_Z$, respectively.

On the basis of said signals, the processing unit 10 determines a first displacement signal $P_X$ and a second displacement signal $P_Y$, which indicate the displacements of the mouse 1 with respect to the first and to the second detection axes X, Y, respectively, and a first state signal LMB and a second state signal RMB, which switch in response to click events and indicate the state (pressed/released) of the left key 7 and of the right key 8, respectively.

The interface 11 is connected to the processing unit 10 for receiving the displacement signals $P_X$, $P_Y$ and the state signals LMB, RMB and transmitting them to the computer 12 in a pre-determined standard format. The interface 11 is of any type suitable for supporting communication with the computer system 12, for example, of an RS-232 or of a USB serial type. Alternatively, it is possible to provide an optical (IR) connection or else to use the bluetooth technology.

Figure 7:
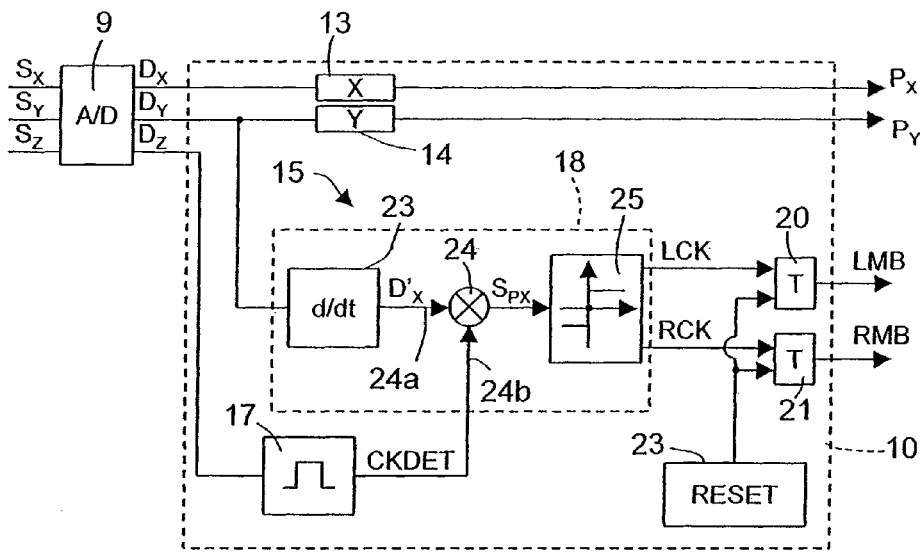
FIG. 7 is a more detailed block diagram of a part of the device of FIG. 1.

With reference to FIG. 7, the processing unit 10 comprises a first processing line 13, a second processing line 14, and a third processing line 15. The first and second processing lines 13, 14 receive from the reading unit 9 the first and second digital acceleration signals $D_X$, $D_Y$ and generate the first displacement signal $P_X$ and the second displacement signal $P_Y$, respectively, on the basis thereof.

The third processing line 15 comprises a recognition module 17, a discrimination stage 18, and a first memory element 20 and a second memory element 21.

Figure 8:
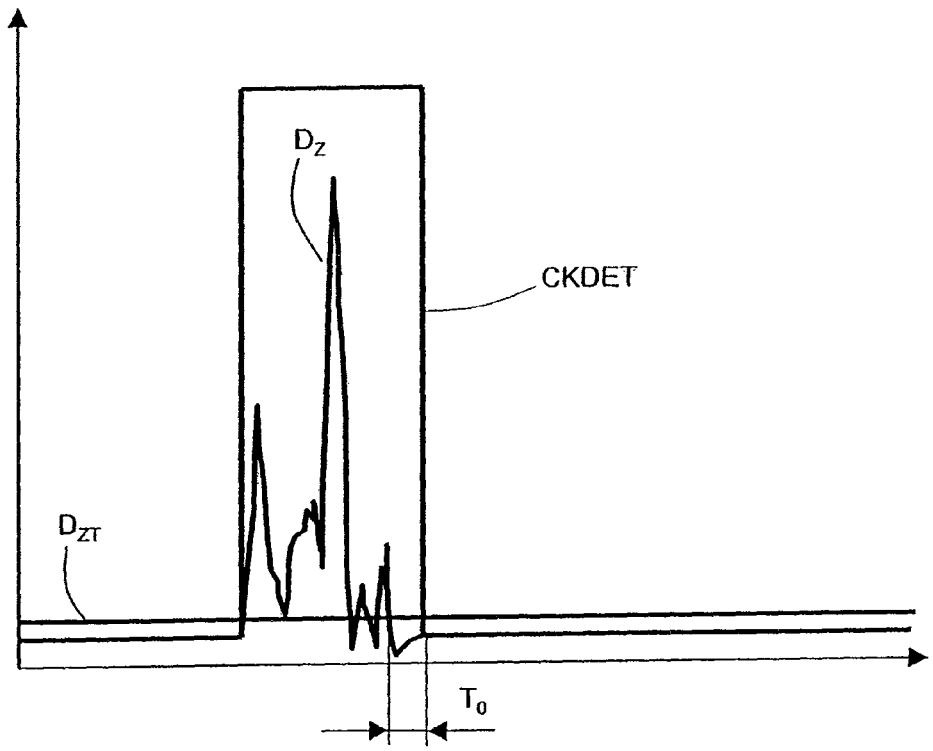
FIG. 8 is a graph that represents quantities regarding the present invention.

The recognition module 17 receives at input the third digital acceleration signal $D_Z$ from the reading unit 9 and supplies on its output a recognition signal CKDET, which indicates a stress directed along the third detection axis Z and has values correlated to the occurrence of click events. In greater detail, the recognition signal CKDET has a (positive) enabling value, when the third digital acceleration signal $D_Z$ is higher than a pre-set threshold $D_{ZT}$, and a disabling value (zero) otherwise (see also FIG. 8). The recognition signal CKDET, consequently, switches to the enabling value in response to a stress along the third detection axis Z (click event) and is maintained constant until the stress ceases (typically, the duration of the perturbations associated to click events is of approximately 200-240 ms). Furthermore, the recognition signal CKDET preferably switches again to the disabling value when a pre-determined time interval $T_0$ has elapsed after the third digital acceleration signal $D_Z$ has dropped below the threshold $D_{ZT}$ (for example, after 10 ms).

The discrimination stage 18 includes a derivative module 23, a multiplier node 24 and a sign discriminator 25. The derivative module 23 receives at input the first digital acceleration signal $D_X$ from the reading unit 9 and calculates the time derivative $D_X'$ thereof. The multiplier node 24 has a first input 24a and a second input 24b connected to the outputs of the derivative module 23 and of the recognition module 17, respectively, and multiplies the value of the time derivative $D_X'$ of the first digital acceleration signal $D_X$ with the value of the recognition signal CKDET. On the output of the multiplier node 24 a product signal $S_{PX}$ is consequently present, which is normally zero, namely, when the mouse 1 is inactive or is displaced without the keys 7, 8 being actuated, and is proportional to the value of the time derivative $D_X'$ when the recognition signal CKDET is at the enabling value, i.e., when a click event occurs.

The sign discriminator 25 is connected to the output of the multiplier node 24 for receiving the product signal $S_{PX}$ and has a first output and a second output connected to the first memory element 20 and to the second memory element 21, respectively. In the embodiment described herein, the sign discriminator 25 supplies first click impulses LCK on the first output and second click impulses RCK on the second output. The first and second click impulses LCK, RCK indicate click events caused by the pressure or release of the left key 7 and of the right key 8, respectively. In practice, the sign discriminator 25 generates a first click impulse LCK when the product signal $S_{PX}$ has a negative sign and a second click impulse RCK when the product signal $S_{PX}$ has a positive sign; no impulses are generated if the product signal $S_{PX}$ is zero. Since the left key 7 and the right key 8 are arranged in opposite positions with respect to the second detection axis Y, the click events corresponding to the left key 7 and the click events corresponding to the right key 8 produce stresses of opposite sign along the first detection axis X. In other words, the first digital acceleration signal initially has a positive or negative peak, according to whether the click event regards the left key 7 or to the right key 8. The sign of the peak is readily identifiable by considering the sign of the time derivative $D_X'$, and each click event can be selectively associated to the left key 7 or else to the right key 8.

The first and second memory elements 20, 21 are, for example, "T" type flip-flops and switch whenever they receive an impulse at input. Outputs of the first and second memory elements 20, 21 supply the first and second state signals LMB, RMB, respectively. Then, the first and second memory elements 20, 21 switch in response to click events produced by the left key 7 and by the right key 8, respectively, and the values of the state signals LMB, RMB indicate the state (pressed/released) of the left key 7 and of the right key 8, respectively.

Preferably, a reset module 23 is associated to the memory elements 20, 21 and restores a configuration corresponding to the state of key released when pre-determined conditions arise (for example, a pre-determined time of a few seconds elapses without any click events occurring).

In practice, the processing unit 10 recognizes that a click event has occurred using the third digital acceleration signal $D_Z$, which is correlated to the vibrations imparted on the casing 2 of the mouse 1 in a direction perpendicular to the plane of sliding PO of the mouse 1 itself. The stresses caused by the click events are discriminated from the accelerations due to the normal movement of the mouse 1 since a click event also causes perturbations directed as the third detection axis Z. During displacement of the mouse 1, instead, the component of acceleration along the third detection axis Z is substantially zero. In other words, recognition of click events is selectively enabled by the recognition module 17 in the presence of a peak of the third digital acceleration signal $D_Z$ and disabled otherwise, on the basis of the recognition signal CKDET. The multiplier node 24 functions as enabling element controlled by the recognition module 17. In addition, the processing unit 10 is able to associate a click event to the left key 7 or to the right key 8 according to the sign of the time derivative $D_X'$ of the first digital acceleration signal $D_X$.

Figure 9:
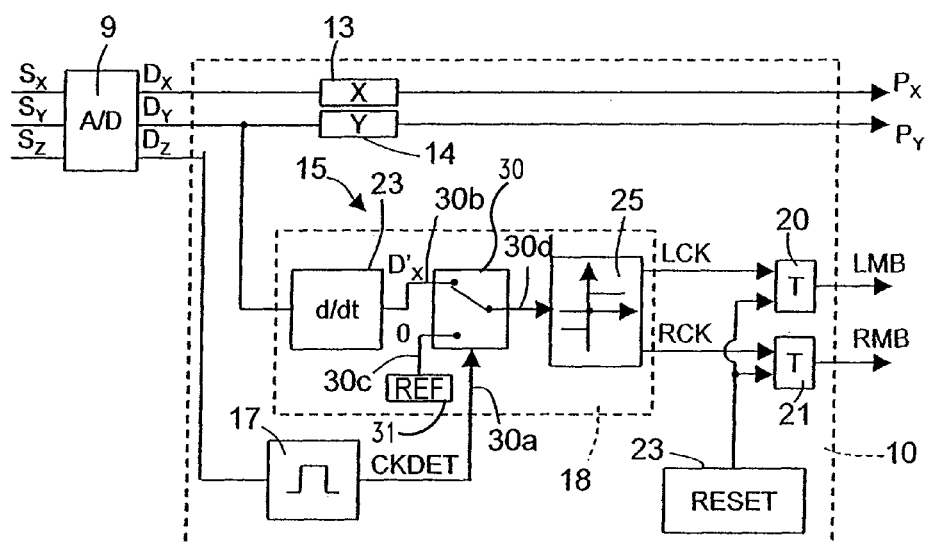
FIG. 9 is a block diagram regarding a pointing device for a computer system in accordance to a second embodiment of the present invention.

A different embodiment of the invention is illustrated in FIG. 9, in which parts that are the same as those already shown are designated by the same reference numbers. In this case, the outputs of the recognition module 17 and of the derivative block 23 are connected to a control input 30a and to a first data input 30b of a selector 30. A second data input 30c of the selector 30 is, instead, connected to a reference block 31, which supplies constantly the value zero. The output 30d of the selector 30 is connected to the sign discriminator 25. The selector 30 is controlled in such a way that the output 30d is connected to the first data input 30b in the presence of the enabling value of the recognition signal CKDET, and to the second data input 30c otherwise. In practice, then, the sign discriminator 25 receives the time derivative $D_X'$ of the first digital acceleration signal $D_X$ in response to a click event, when the recognition signal CKDET has the enabling value, and the value zero otherwise.

Figure 10:
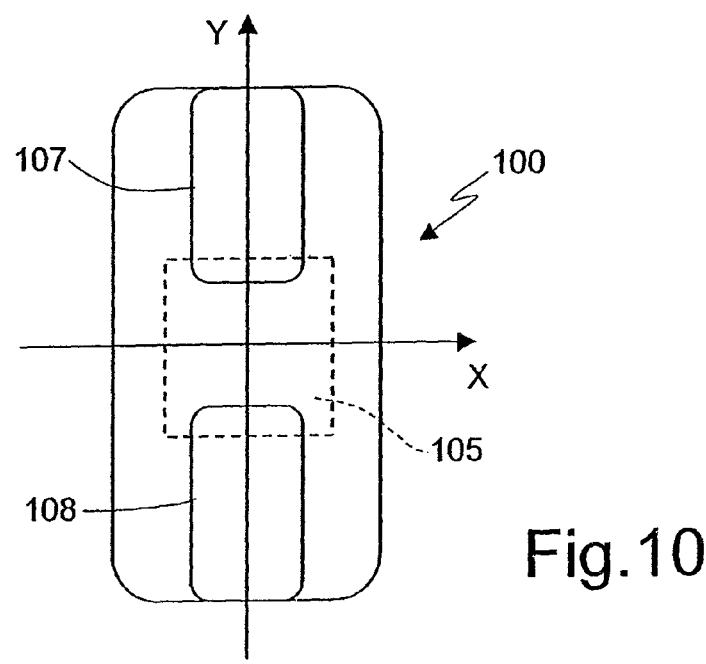
FIG. 10 is a top plan view of a pointing device for a computer system according to a third embodiment of the present invention.
Figure 11:
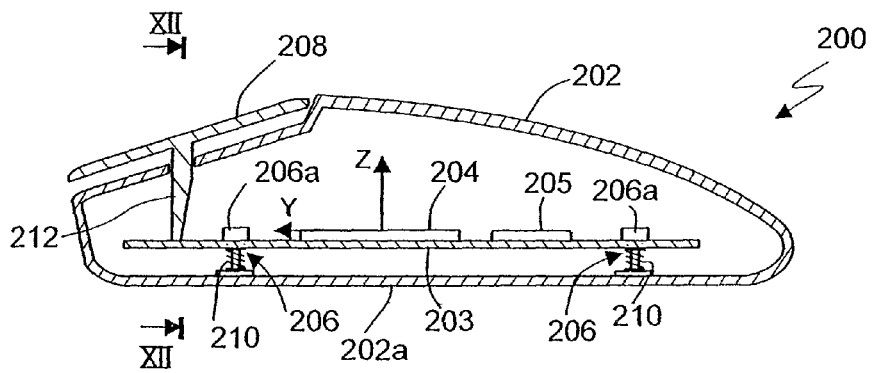
FIG. 11 is a lateral right-hand view of the device of FIG. 1, sectioned along the plane of trace XI-XI of FIG. 12, of a pointing device for a computer system according to a fourth embodiment of the present invention.

In the embodiment of FIG. 10, a mouse 100 comprises a front key 107 and a rear key 108 arranged in respective opposite positions with respect to the first detection axis X of a MEMS inertial sensor 105. Consequently, detection of the click events is based upon the second digital acceleration signal $D_Y$ and upon its time derivative $D_Y'$. Different key arrangements are in any case possible.

According to a further embodiment of the invention, shown in FIGS. 11-15, a mouse 200 comprises a casing 202, provided with a left key 207 and a right key 208, and a board 203, set on which are a triaxial inertial sensor 204 and a microcontroller 205. In particular, the inertial sensor 204 has a first detection axis X, a second detection axis Y, and a third detection axis Z, which are mutually perpendicular. The first and second detection axes X, Y are parallel to the plane of the board 203, whereas the third detection axis Z is perpendicular thereto. In addition, the second and third detection axes Y, Z together identify a median longitudinal plane of the mouse 200. Furthermore, the left key 207 and the right key 208 are arranged in opposite positions with respect to the median longitudinal plane and to the second detection axis Y.

Figure 12:
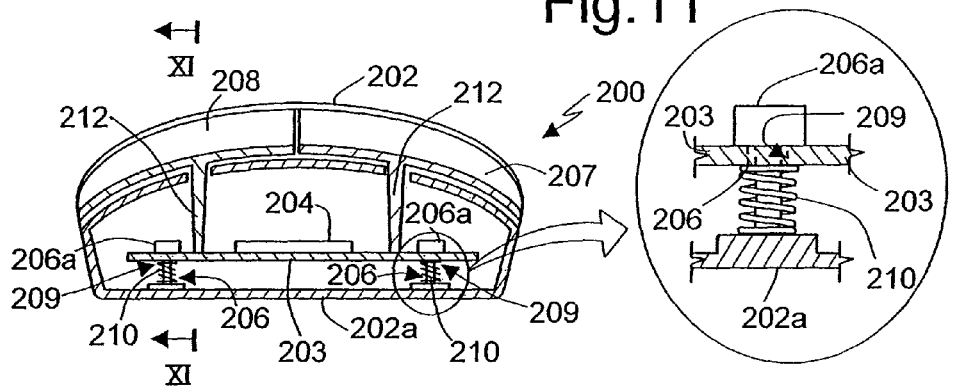
FIG. 12 is a front view of the device of FIG. 11, sectioned along the plane of trace XII-XII of FIG. 11.
Figure 13:
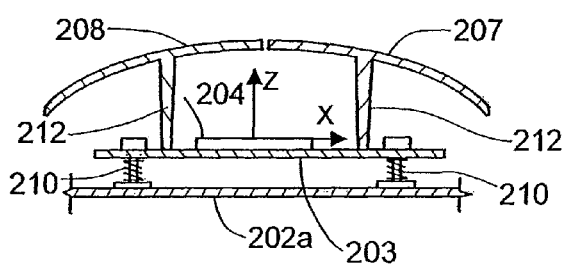
FIGS. 13 and 14 are schematic front views transversely sectioned of the device of FIG. 11 in respective operative configurations.
Figure 14:
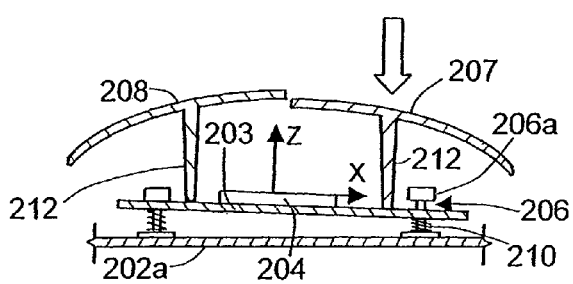

The board 203 is mechanically connected to the casing 202 so as to be maintained substantially parallel to a plane of sliding PO of the mouse 200 (normally horizontal) and so as to present, moreover, a margin of mobility with respect to the casing 202 itself. In greater detail, four guide screws or pins 206, provided with respective heads 206a, are inserted with play in as many through holes 209 made on the board 203 and are fixed to the bottom 202a of the casing 202. The board 203 can then slide along the pins 206. Furthermore, springs 210 are fitted on respective pins 206 and, in particular, are arranged between the board 203 and the bottom 202a of the casing 202 so as to push the board 203 against the heads 206a of the pins 206, where it is blocked in a resting position substantially parallel to the plane of sliding PO. The left key 207 and the right key 208 are provided with respective pins 212, which project towards the inside of the casing 202 and are shaped so as to touch on the board 203 when the respective keys 207, 208 are released (FIGS. 12 and 13). When, instead, one of the keys 207, 208 (the left key 207, in the example of FIG. 14) is pressed, the corresponding pin 212 exerts a pressure on the board 203, which is tilted. In particular, the pins 212 act on the board 203 asymmetrically with respect to the second axis Y, in such a way that the board 203 will be tilted in opposite directions, again rotating about the second axis Y, according to whether the left key 207 or else the right key 208 has been actuated. The springs 210 bring the board 203 back again into its resting position against the heads 206a of the pins 206 when the keys 207, 208 are released.

Figure 15:
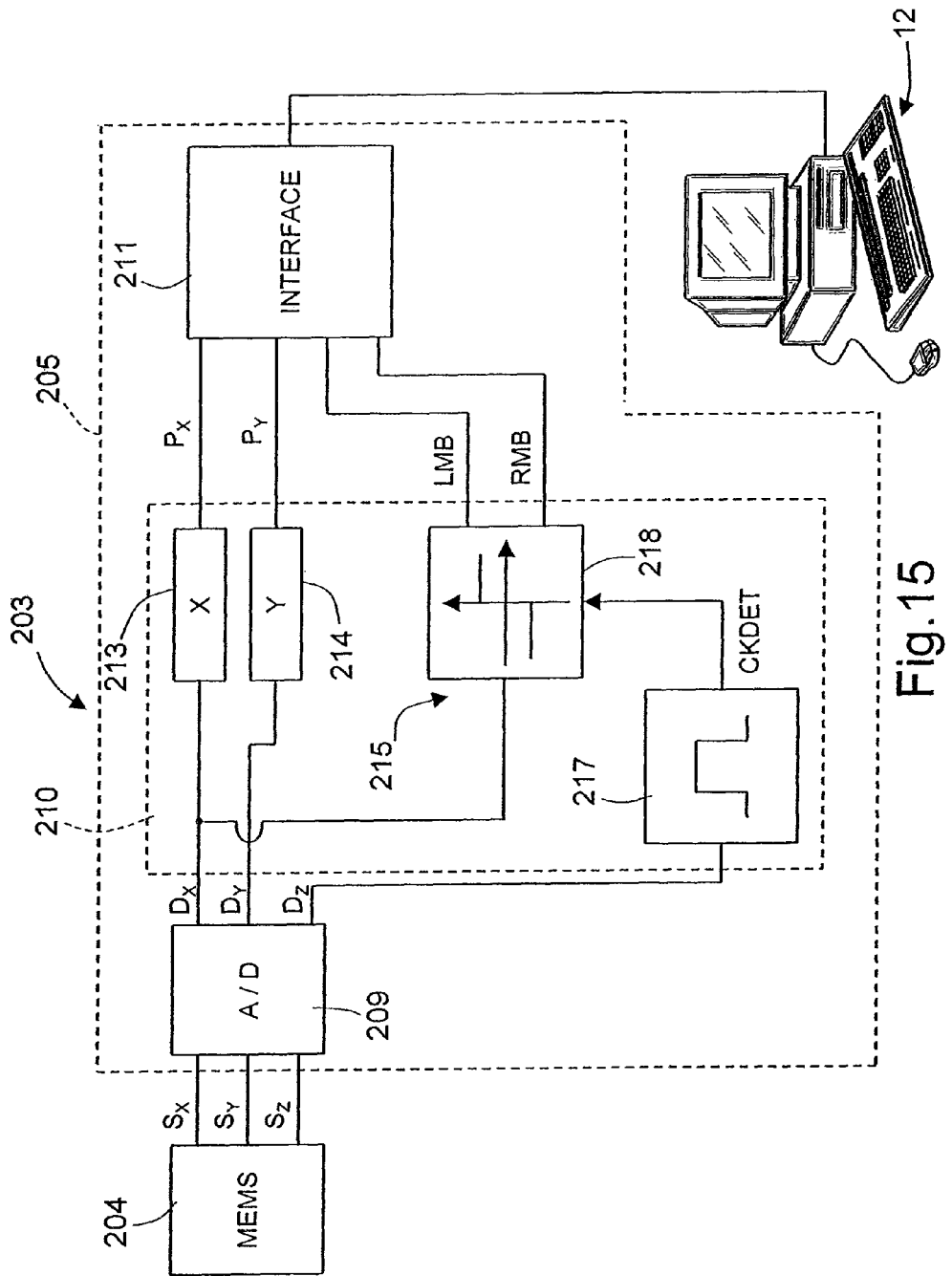
FIG. 15 is a block diagram corresponding to the device of FIG. 11.

The inertial sensor 204 is fixed to the board 203 and supplies a first analog detection signal $S_X$, a second analog detection signal $S_Y$, and a third analog detection signal $S_Z$ to the microcontroller 205 (see also FIG. 15). In this case, the first, second and third analog detection signals $S_X$, $S_Y$, $S_Z$ are correlated both to the accelerations imparted on the inertial sensor 204 during the displacements of the mouse 200 and to the variations of inclination of the board 203. In fact, the inertial sensor 204 is sensitive also to the action of the acceleration of gravity and responds by modifying the first analog detection signal $S_X$, the second analog detection signal $S_Y$, or the third analog detection signal $S_Z$, when the direction of the corresponding detection axis X, Y, Z varies with respect to the direction of the acceleration of gravity. In other words, a variation in inclination of one of the detection axes X, Y, Z is equivalent for the inertial sensor 204 to an acceleration along the same axis, and thus the inertial sensor 204 can be used as inclinometer.

The microcontroller 205 comprises: a reading unit 209, which converts the first, second, and third analog detection signals $S_X$, $S_Y$, $S_Z$ into a first digital detection signal $D_X$, a second digital detection signal $D_Y$, and a third digital detection signal $D_Z$, respectively; a processing unit 210; and an interface 211, for connection to a computer system 12 of the type as the one illustrated in FIG. 6. In particular, the processing unit 210 is configured so as to recognize a click event when the first digital detection signal $D_X$ is other than zero and, simultaneously, the third digital detection signal $D_Z$ exceeds a pre-set threshold. Furthermore, the processing unit 210 is configured so as to assign each recognized click event selectively to the left key 207 or to the right key 208 on the basis of the sign of the first detection signal $S_X$.

In particular, the processing unit 210 comprises: a first processing line 213 and a second processing line 214, which supply a first displacement signal $P_X$ and a second displacement signal $P_Y$, respectively, of the mouse 200 on the basis of the first digital acceleration signal $D_X$ and of the second digital acceleration signal $D_Y$ and a third processing line 215.

The third processing line 215 comprises: a recognition module 217, which generates a recognition signal CKDET when the third digital detection signal $D_Z$ exceeds a pre-set threshold; and a sign-discriminator module 218.

The sign-discriminator module 218 is selectively enabled by the recognition module 217 by means of the recognition signal CKDET and, on the basis of the sign of the first digital detection signal $D_X$, generates a first state signal LMB and a second state signal RMB, which indicate the state (pressed/released) of the left key 207 and of the right key 208, respectively. In greater detail, the first state signal LMB presents a first value when the sign-discriminator module 218 is enabled and the first digital detection signal $D_X$ has a first sign, determined by activation of the left key 207, and a second value otherwise. The second state signal RMB presents the first value when the sign-discriminator module 218 is enabled and the first digital detection signal $D_X$ has a second sign, determined by activation of the right key 208, and the second value otherwise. In practice, the first and second state signals LMB, RMB are normally at the second value (key released) and switch to the first value when the left key 207 and the right key 208, respectively, are pressed.

The manual pointing device according to the invention is advantageous because a single inertial sensor and a single control device can be used both for detection of the movement in the plane of sliding, which enables a pointer to be guided on the screen of a computer system, and for detection of the click events. Instead, in traditional manual pointing devices separate sensors and control circuits are required for detecting the movement and the click events. The pointing device according to the invention is also less subject to failures: in particular, any problems linked to oxidation of the contacts for detection of the click events are prevented.

Finally, it is evident that modifications and variations may be made to the device and to the method described herein, without departing from the scope of the present invention.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. An apparatus, comprising:
a first key configured to be manually actuatable by a user, the first key having a mechanism operative to mechanically generate vibrations in the first key that propagate outwardly from the first key along first, second, and third detection axes that are perpendicular to each other, in response to actuation of the first key;
a key-actuation detection circuit coupled to the first key and configured to detect actuation of the first key, the key-actuation detection circuit including an inertial-sensor circuit configured to detect the vibrations propagating from the first key along the first, second, and third detection axes and to supply first, second, and third detection signals in response to the detection of the vibrations acting along the first, second, and third detection axes, respectively;
a casing on which the first key is arranged;
a board coupled to the casing and rigidly coupled to the inertial-sensor circuit in a manner that enables the inertial-sensor circuit to detect the vibrations that propagate through the casing from the first key along the first, second, and third detection axes in response to actuation of the first key; and
a compliant-support device mounted between the casing and the board, the compliant support device configured to support the board in a resting position and to enable the board to move along the third detection axis with respect to the casing,
wherein the first key includes a first mechanical-coupling element configured to exert a pressure on the board asymmetrically with respect to the second detection axis in response to actuation of the first key and cause the board to be inclined and rotate about the second detection axis.

2. The apparatus of claim 1, further comprising a second key having a second mechanical-coupling element configured to exert a pressure on the board asymmetrically with respect to the second axis in response to actuation of the second key and cause the board to be inclined and rotate about the second detection axis.

3. The apparatus of claim 2, wherein the first and second keys and the first and second mechanical-coupling elements are configured to incline the board in opposite directions in which inclination of the board produced by actuation of the first key is opposite to the inclination produced by actuation of the second key.

4. The apparatus of claim 1, comprising a plurality of springs mounted between the casing and the board, the springs configured to support the board in a resting position and to enable the board to move along the third detection axis with respect to the casing.

5. The apparatus of claim 1, further comprising:
a first processing line coupled to the inertial-sensor circuit and configured to determine a displacement of the apparatus along the first detection axis based on the first detection signal; and
a second processing line coupled to the inertial-sensor circuit and configured to determine a displacement of the apparatus along the second detection axis based on the second detection signal.

6. An apparatus comprising:
a first key configured to be manually actuatable by a user, the first key having a mechanism operative to mechanically generate vibrations in the first key that propagate outwardly from the first key along first, second, and third detection axes that are perpendicular to each other, in response to actuation of the first key;
a key-actuation detection circuit coupled to the first key and configured to detect actuation of the first key, the key-actuation detection circuit including an inertial-sensor circuit configured to detect the vibrations propagating from the first key along the first, second, and third detection axes and to supply first, second, and third detection signals in response to the detection of the vibrations acting along the first, second, and third detection axes, respectively and
a second key configured to be actuated manually by a user and to mechanically generate vibrations within the second key that propagate outwardly from the second key along the first, second, and third detection axes in response to the manual actuation of the second key, wherein the inertial-sensor circuit is configured to detect the vibrations generated by the actuation of the second key, along the first, second, and third detection axes and to supply the first, second, and third detection signals in response to the detection of the vibrations generated by the actuation of the second key and acting along the first, second, and third detection axes, respectively.

7. The apparatus of claim 6, wherein the key-actuation detection circuit includes a processing circuit electrically coupled to the inertial-sensor circuit and configured to supply a recognition signal, indicating detection of actuation of one of the first and second keys by the user, based on the second and third detection signals.

8. The apparatus of claim 7, wherein the processing circuit includes:
a recognition module configured to receive the third detection signal, detect whether the third detection signal exceeds a threshold, and provide a recognition signal having a value that depends on whether the third detection signal exceeds the threshold.

9. The apparatus of claim 8, wherein the processing circuit includes a discrimination circuit configured to associate a key actuation event selectively to one of the first and second keys based on the second detection signal.

10. The apparatus of claim 9, wherein the processing circuit includes a derivative module coupled to the inertial-sensor circuit and configured to determine a time derivative of the second detection signal, and the discrimination circuit is configured to associate the key actuation event selectively to one of the first and second keys based on the time derivative of the second detection signal.

11. The apparatus of claim 10 wherein the recognition module is coupled to the discrimination circuit and is configured to enable and disable the discrimination circuit selectively based on the recognition signal.

12. The apparatus of claim 10 wherein the processing circuit includes a multiplier having a first input coupled to an output of the derivative circuit, a second input coupled to an output of the recognition module, and an output coupled to an input of the discrimination circuit.

13. A system, comprising:
a first key manually actuatable by a user; and a key-actuation detection circuit coupled to the first key and configured to detect actuation of the first key, the key-actuation detection circuit including:
- an inertial-sensor circuit configured to detect mechanical stresses generated by actuation of the first key, the inertial-sensor circuit having first, second, and third detection axes perpendicular to one another, the inertial-sensor circuit being configured to supply a first detection signal, a second detection signal, and a third detection signal in response to the mechanical stresses generated along the first detection axis, the second detection axis, and the third detection axis, respectively;
- a recognition circuit coupled to the inertial-sensor circuit and configured to supply a recognition signal indicative of the mechanical stresses detected along the third detection axis; and
- a discrimination circuit configured to detect the actuation of the first key based on the recognition signal and at least one of the first and second detection signals.

14. The system of claim 13, further comprising:
a casing on which the first key is arranged; and
a board coupled to the casing and configured to carry the inertial-sensor circuit in a manner that enables the inertial-sensor circuit to detect the mechanical stresses along the first, second, and third detection axes in response to actuation of the first key.

15. The system of claim 14, wherein the board is rigidly coupled to the casing and the casing is configured to transmit the mechanical stresses, generated by actuation of the first key, to the inertial-sensor circuit via the board.

16. The system of claim 14, further comprising a second key manually actuatable by a user, wherein the board is configured to incline in a first direction when the first key is actuated and to incline in a second direction when the second key is actuated, and the discrimination circuit is configured to detect inclination of the board in response to activation of either the first key or the second key.

17. The system of claim 16 wherein the discrimination circuit includes a sign discriminator module configured to detect the inclination of the board based on a sign of the first detection signal.

18. The system of claim 13 wherein the recognition circuit is coupled to the discrimination circuit and configured to enable and disable the discrimination circuit selectively based on the recognition signal.

19. An apparatus, comprising:
a first key and a second key each configured to be manually actuatable by a user,
a key-actuation detection circuit coupled to the first and second keys and configured to detect actuation of the first and second keys, the key-actuation detection circuit including:
- an inertial-sensor circuit configured to detect mechanical stresses, generated by actuation of the first key and the second key by the user, along first, second, and third detection axes that are perpendicular to each other and to supply first, second, and third detection signals in response to the mechanical stresses acting along the first, second, and third detection axes, respectively;
- a derivative module coupled to the inertial-sensor circuit and configured to determine a time derivative of the second detection signal; and
- a discrimination circuit configured to associate a key actuation event selectively to one of the first and second keys based on a time derivative of the second detection signal.

20. The apparatus of claim 19, wherein the key-actuation detection circuit includes a recognition module configured to receive the third detection signal, to detect whether the third detection signal exceeds a threshold, and to provide a recognition signal having a value that depends on whether the third detection signal exceeds the threshold.

21. The apparatus of claim 19, further comprising:
a casing on which the first and second keys are arranged; and
a board coupled to the casing and configured to carry the inertial-sensor circuit in a manner that enables the inertial-sensor circuit to detect the mechanical stresses along the first, second, and third detection axes in response to actuation of the first key and actuation of the second key.

22. The system of claim 21, wherein the board is rigidly coupled to the casing and the casing is configured to transmit the mechanical stresses, generated by actuation of the first key, to the inertial-sensor circuit via the board.

* * * * *